(12) United States Patent
Miyazaki

(10) Patent No.: US 7,911,675 B2
(45) Date of Patent: Mar. 22, 2011

(54) OPTICAL MODULATION DEVICE AND OPTICAL SEMICONDUCTOR DEVICE

(75) Inventor: Yasunori Miyazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 12/253,286

(22) Filed: Oct. 17, 2008

(65) Prior Publication Data

US 2009/0323164 A1  Dec. 31, 2009

(30) Foreign Application Priority Data

Jun. 27, 2008  (JP) .................. 2008-168556

(51) Int. Cl.
G02F 1/01 (2006.01)
G02F 1/03 (2006.01)
G02F 1/29 (2006.01)

(52) U.S. Cl. .............. 359/279; 359/245; 359/315

(58) Field of Classification Search .......... 359/315, 359/245, 247, 251–252, 254, 108, 237–238, 359/278–279, 290–292, 298, 300–302; 385/1–3, 385/40, 129–132, 5, 8–9

See application file for complete search history.

(56) References Cited

U.S. PATENT DOCUMENTS

| | | | |
|---|---|---|---|
| 4,893,352 A * | 1/1990 | Welford | 398/198 |
| 5,638,468 A | 6/1997 | Tokano et al. | |
| 5,995,685 A | 11/1999 | Seino | |
| 6,334,005 B1 | 12/2001 | Burie et al. | |
| 6,650,458 B1 * | 11/2003 | Prosyk et al. | 359/276 |
| 6,798,557 B1 * | 9/2004 | Leven | 359/279 |
| 2005/0058425 A1 * | 3/2005 | Berini et al. | 385/147 |
| 2007/0195396 A1 * | 8/2007 | Hashimoto et al. | 359/236 |

FOREIGN PATENT DOCUMENTS

| | | |
|---|---|---|
| JP | 10-10480 A | 1/1998 |
| JP | 11-101961 A | 4/1999 |
| JP | 2000-187191 A | 7/2000 |
| JP | 2001-159750 A | 6/2001 |
| JP | 2004-157203 A | 6/2004 |

OTHER PUBLICATIONS

Koyama et al.; "Frequency Chirping in External Modulators", *J. of Lightwave Tech.*, vol. 6, No. 1, pp. 97-93, (Jan. 1988).

Makino et al.; "Wide Temperature (15° C. to 95° C.), 80-km SMF Transmission of a 1.55 μm, 10-Gbit/s InGaAlAs Electroabsorption Modulator Integrated DFB Laser", *2006 Optical Society of America*, OMS1.pdf.

Leuthold et al.; "Multimode Interference Couplers with Turnable Power Splitting Ratios", *J. of Lightwave Tech.*, vol. 19, No. 5, pp. 700-707, (May 2001).

* cited by examiner

*Primary Examiner* — Ricky Mack
*Assistant Examiner* — Dawayne A Pinkney
(74) *Attorney, Agent, or Firm* — Leydig, Voit & Mayer, Ltd.

(57) ABSTRACT

An optical modulation device includes: an optical splitter for splitting input light into a first input beam and a second input beam; an optical intensity modulator for modulating the intensity of the first input beam in response to a modulating signal; a variable optical phase shifter for shifting the phase of the second input beam; and an optical combiner for combining an output beam of the optical intensity modulator and an output beam of the variable optical phase shifter into a combined beam and outputting the combined beam. The amount of phase shift produced by the variable optical phase shifter is externally controlled.

16 Claims, 12 Drawing Sheets

---- the output light of the optical intensity modulator
—— the output light of the optical modulation device ---- the output light of the optical intensity modulator
——  the output light of the optical modulation device

OPTICAL MODULATION DEVICE AND OPTICAL SEMICONDUCTOR DEVICE

BACKGROUND OF THE INVENTION

1. Field of the Invention

The present invention relates to an optical modulation device which receives a light beam and modulates its intensity, and more particularly to an optical modulation device adapted to allow control of the chirp characteristics of the output beam.

2. Background Art

The three types of optical modulators capable of high-speed modulation (10 Gbit/s or more) which have been used in practical applications are: (1) the lithium niobate (LiNbO$_3$) Mach-Zehnder optical modulator, (2) the semiconductor Mach-Zehnder optical modulator, and (3) the electro absorption optical modulator. Lithium niobate Mach-Zehnder optical modulators are most widely used as modulation light sources in optical transponders, since their performance varies only a little with temperature and wavelength variations and they have stable chirp characteristics.

In a lithium niobate Mach-Zehnder optical modulator, the incident light beam is divided equally by an optical splitter into two beams which are then passed through their respective waveguides. At that time, modulating signals of equal amplitude but 180° out of phase are respectively applied to these waveguides to change their refractive indices and thereby change the phases of the waveguide beams by ±90°, respectively. The waveguide beams are then combined by an optical combiner and output from the modulator, thus converting the phase modulation into intensity modulation.

Lithium niobate Mach-Zehnder optical modulators typically have a waveguide length of 30-50 mm; that is, optical semiconductor devices incorporating this type of optical modulator must be as much as 50-100 mm in length. Although prior art optical transponders (dimensioned 5 inches by 7 inches, or 4.5 inches by 3.5 inches) have a space for accommodating such an optical semiconductor device(s), there is no such space available in XFP (10 Gigabit Form Factor Pluggable) optical transceivers, which have been recently used in response to the decreasing size of optical communications devices. It is not possible to sufficiently reduce the size of lithium niobate Mach-Zehnder optical modulators, since application of a voltage to LiNbO$_3$ results in only a small change in its refractive index (the actual amount of change being determined by the material constants). As a result, this type of optical modulator must have a length on the order of a few tens of millimeters or more (as described above) to introduce a 90° phase change in the beams traveling through its waveguides.

In the case of a semiconductor Mach-Zehnder optical modulator, on the other hand, the modulator can cause ±90° phase changes in the beams propagating through its semiconductor optical waveguides even if the waveguides are as short as approximately a few millimeters in length, provided that they have a band gap wavelength approximately 100 nm shorter than the wavelength of the incident light. Such semiconductor Mach-Zehnder optical modulators have proven to function satisfactorily. Therefore, the size of semiconductor Mach-Zehnder optical modulators can be reduced, making them suitable for use in XFP optical transceivers. Furthermore, a semiconductor Mach-Zehnder optical modulator may be formed from a material used to form an optical communications laser (e.g., InGaAsP on an InP substrate). This enables the optical modulator to be integrally and monolithically formed with the optical communications laser, resulting in a simplified optical system and hence reduced cost. It should be noted that the performance of semiconductor Mach-Zehnder optical modulators is more susceptible to temperature and wavelength variations than the performance of lithium niobate Mach-Zehnder optical modulators but less susceptible than the performance of electro absorption optical modulators. Therefore, semiconductor Mach-Zehnder optical modulators are a promising optical modulator that can be combined with a variable wavelength laser to provide a next-generation small size variable wavelength modulation light source.

However, the length of semiconductor Mach-Zehnder optical modulators (approximately a few millimeters) is still too large to form them in a sufficient quantity on a compound semiconductor wafer, resulting in increased manufacturing cost. (For example, InP wafers are 2-3 inches in diameter.) On the other hand, electro absorption optical modulators can be approximately 0.2 mm long, with an extinction ratio of approximately 10 dB, for example. Furthermore, they can be easily monolithically integrated with a semiconductor laser and are often used in fixed wavelength XFP transceivers.

SUMMARY OF THE INVENTION

The optical loss in a semiconductor optical waveguide includes wavelength independent components, which are caused by the irregularities on the sides of the waveguide, etc., and wavelength dependent components, which are caused by interband absorption, free carrier absorption, etc. The band gap wavelength of the semiconductor optical waveguide is set relatively close to the wavelength of the incident light (namely, approximately 100 nm away from the incident light wavelength) in order to cause a large change in its refractive index when a voltage is applied to the waveguide. Therefore, the optical loss and the effective refractive index of the semiconductor optical waveguide tend to vary with variations in the amount of interband absorption, etc. resulting from variations in the in-plane composition of the semiconductor wafer, for example. That is, in the case of an optical modulator employing semiconductor optical waveguides (namely, one upper and one lower semiconductor optical waveguide), it is difficult to accurately control the optical loss and the effective refractive index of these semiconductor optical waveguides, resulting in significant variations in the chirp characteristics of the output light beam.

Further, it is required that semiconductor Mach-Zehnder optical modulators and electro absorption optical modulators be operated in a substantially constant temperature environment. That is, since the band gap of semiconductor material varies with temperature, the characteristics of these optical modulators also vary with temperature. Therefore, these modules are often used in combination with a peltiert device to maintain their temperature constant. However, peltiert devices have high power consumption.

A modulator integrated laser has been proposed in which a semiconductor laser is monolithically integrated with an electro absorption optical modulator made of AlGaInAs and the bias voltage is adjusted based on temperature. This modulator integrated laser is suitable for use in optical transceivers which, in order to reduce power consumption, do not employ a peltiert device. It has been verified that the use of this laser allows for 10 Gbit/s transmission over a wide temperature range [see, e.g., Makino et al., Proceedings of the Optical Fiber Communication Conference (OFC2007), No. OMS1]. In order to use such a modulator integrated laser in practical applications, however, it is necessary to solve problems such as a significant reduction in the optical output at high temperatures and difficulty in ensuring long term reliability. (It should be noted that it is usually difficult to ensure that optical devices containing Al exhibit long term reliability.)

Thus, optical transceivers which do not employ a peltiert device (which has considerable power consumption) are limited to those in which the laser is directly modulated. However, direct modulation allows the production of good waveforms only at bit rates of 10 Gbit/s or less. For this reason there has yet to be developed a low power consumption optical transceiver having a bit rate of 40 Gbit/s.

Further, since the band gap wavelength of electro absorption optical modulators is set relatively close to the wavelength of the incident light (namely, approximately 50 nm away from the incident light wavelength), the absorption coefficient and the refractive index vary significantly with wavelength variations, which has prevented the modulators from being used in combination with a variable wavelength laser.

The present invention has been devised to solve the above problems. It is, therefore, a first object of the present invention to provide an optical modulation device adapted to allow control of the chirp characteristics of its output beam.

A second object of the present invention is to provide a small size, low power consumption, yet low-cost optical semiconductor device capable of operation at a high modulation bit rate and exhibiting the desired performance independently of the ambient temperature.

A third object of the present invention is to provide an optical semiconductor device capable of exhibiting the desired performance independently of wavelength.

According to a first aspect of the present invention, an optical modulation device comprises: an optical splitter for splitting input light into a first input beam and a second input beam; an optical intensity modulator for modulating the intensity of said first input beam in response to a modulating signal; a variable optical phase shifter for shifting the phase of said second input beam; and an optical combiner for combining an output beam of said optical intensity modulator and an output beam of said variable optical phase shifter into a combined beam and outputting said combined beam; wherein said optical modulation device is adapted to allow external control of the amount of phase shift produced by said variable optical phase shifter.

According to a second aspect of the present invention, an optical semiconductor device comprising: the optical modulation device according to the first aspect of the present invention; and a control circuit for controlling said optical modulation device; wherein said control circuit adjusts a characteristic of said output beam of said optical modulation device to be less temperature dependent than that of said output beam of said optical intensity modulator by varying, in accordance with ambient temperature, said amount of phase shift produced by said variable optical phase shifter.

According to a third aspect of the present invention, an optical semiconductor device comprising: the optical modulation device according to the first aspect of the present invention; and a control circuit for controlling said optical modulation device; wherein said control circuit adjusts a characteristic of said output beam of said optical modulation device to be less wavelength dependent than that of said output beam of said optical intensity modulator by varying, in accordance with the wavelength of said input light, said amount of phase shift produced by said variable optical phase shifter.

Thus, the first aspect of the present invention can provide an optical modulation device adapted to allow control of the chirp characteristics of its output beam.

Further, the second aspect can provide a small size, low power consumption, yet low-cost optical semiconductor device capable of operation at a high modulation bit rate and exhibiting the desired performance independently of the ambient temperature.

Further, the third aspect of the present invention can provide an optical semiconductor device capable of exhibiting the desired performance independently of wavelength.

DETAILED DESCRIPTION OF THE PREFERRED EMBODIMENTS

First Embodiment

Figure 1:
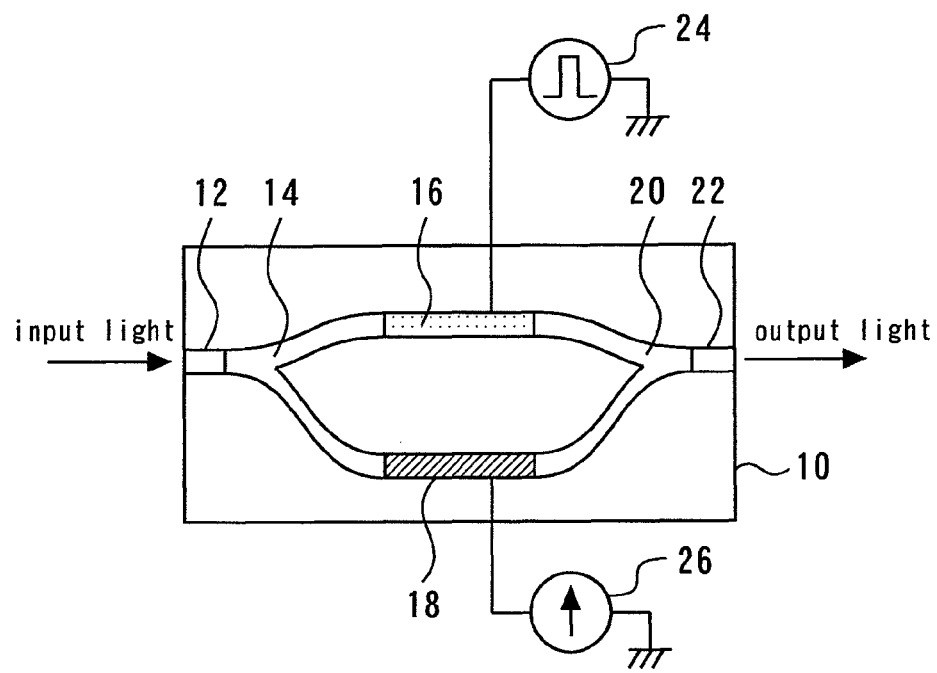
FIG. 1 is a diagram showing an optical modulation device according to a first embodiment of the present invention.

FIG. 1 is a diagram showing an optical modulation device according to a first embodiment of the present invention. The optical modulation device 10, includes an input optical waveguide 12, an optical splitter 14, an optical intensity modulator 16, a variable optical phase shifter 18, an optical combiner 20, and an output optical waveguide 22. The optical splitter 14 splits the input light beam received through the input optical waveguide 12 into first and second input beams.

The optical intensity modulator 16 modulates the intensity of the first input beam in response to a modulating signal received from an external modulator driver 24. The optical intensity modulator 16 maybe, for example, a 200 μm long electro absorption optical modulator. Electro absorption optical modulators can be typically as short as 0.3 mm or less in length, meaning that the size of the optical intensity modulator 16 can be reduced.

The variable optical phase shifter 18 shifts the phase of the second input beam in response to a current received from an external current source 26. That is, the amount of phase shift produced by the variable optical phase shifter 18 can be externally controlled. The variable optical phase shifter 18 may be, for example, a semiconductor laser or semiconductor optical amplifier adapted such that a variation in the current injected into its active layer (a waveguide) results in a variation in the refractive index of the layer. It should be noted that semiconductor lasers and semiconductor optical amplifiers can be formed relatively easily. Further, varying the amount of current injected into the active layer (or waveguide) can cause a large change in its refractive index, even with a short device length, as compared to applying a reverse bias voltage to the active layer. According to the present embodiment, a DC current is applied to the variable optical phase shifter 18, thereby precluding the problem of high frequency response. Therefore, a semiconductor optical amplifier capable of providing a large refractive index change and hence a large phase shift is used as the variable optical phase shifter 18. It should be noted that the variable optical phase shifter 18 may be a device with a waveguide adapted such that a voltage can be externally applied to the waveguide so as to vary substantially only the real part of its refractive index.

The optical combiner 20 combines the output beams from the optical intensity modulator 16 and from the variable optical phase shifter 18 and outputs the combined beam through the output optical waveguide 22. The (intensity) ratio of the first input beam to the second input beam emerging from the optical splitter 14 is such that the optical path from the input optical waveguide 12 to the optical intensity modulator 16 has a smaller insertion loss than the optical path from the input optical waveguide 12 to the variable optical phase shifter 18. Further, the optical combiner 20 combines the output beams from the optical intensity modulator 16 and from the variable optical phase shifter 18 in such a ratio that the optical path from the optical intensity modulator 16 to the output optical waveguide 22 has a smaller insertion loss than the optical path from the variable optical phase shifter 18 to the output optical waveguide 22. This ensures that the output beam from the optical intensity modulator 16 has higher intensity than the output beam from the variable optical phase shifter 18 when these beams are combined by the optical combiner 20.

Figure 2:
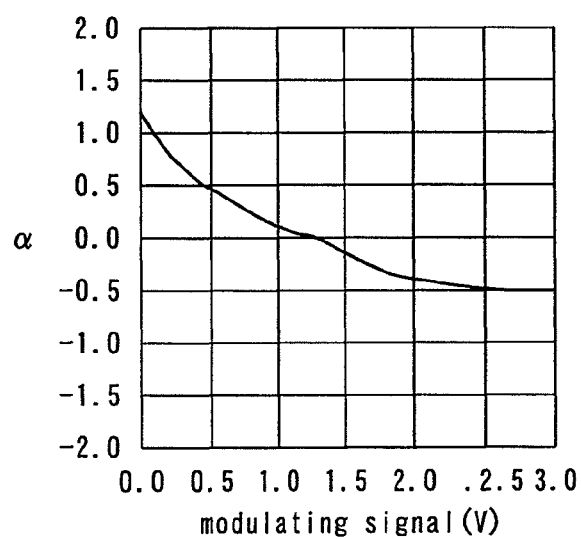
FIG. 2 is a diagram showing the chirp characteristics of the optical intensity modulator 16 shown in FIG. 1.

FIG. 2 is a diagram showing the chirp characteristics of the optical intensity modulator 16 shown in FIG. 1. The chirp characteristics correspond to the dependence of the a parameter (described below) of the optical intensity modulator 16 on the modulating signal, i.e., the reverse bias voltage applied to the optical intensity modulator 16. An a parameter is the ratio of the variation of the real part ($\Delta n'$) to the variation of the imaginary part ($\Delta n''$) of the complex refractive index of a waveguide (or optical modulator) when a small modulating signal is applied to the waveguide, as expressed by the following equation:

$$\alpha = \frac{\Delta n'}{\Delta n''} \qquad \text{(Eq. 1)}$$

(See, e.g., Koyama et al., JOURNAL OF LIGHTWAVE TECHNOLOGY, VOL. 6, NO. 1, pp. 87-93, 1998.)

Figure 3:
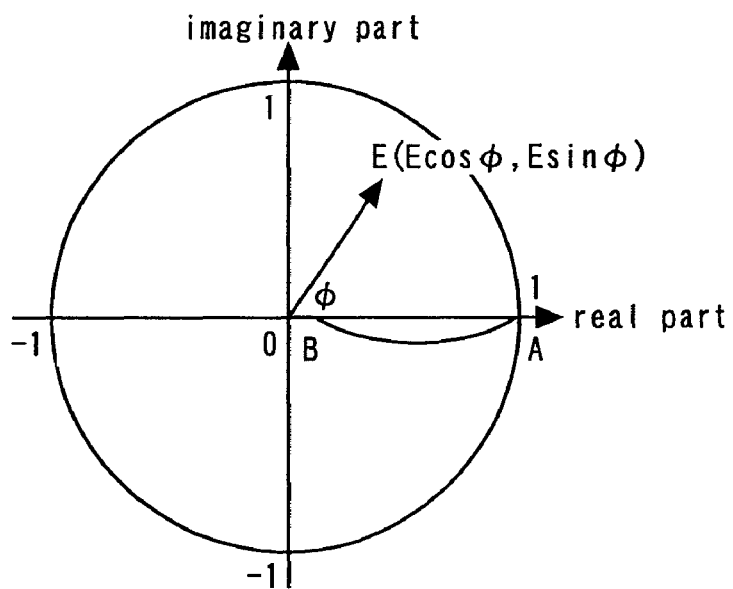
FIG. 3 is a diagram showing the electric field vector of the output beam of the optical intensity modulator.

FIG. 3 is a diagram showing the electric field vector of the output beam of the optical intensity modulator. The horizontal axis represents the real part of the electric field vector, and the vertical axis represents the imaginary part. That is, FIG. 3 shows variations in the intensity and the phase of the output beam of the optical intensity modulator 16. This graph is normalized such that point A at (1,0) coordinates represents the optical intensity and phase of the output beam of the optical intensity modulator 16 when the modulating signal is at 0 V. When the optical intensity modulator 16 transitions from its ON state to its OFF state, the tip of the electric field vector, E, of the output beam from the optical intensity modulator 16 traces out a curve AB, that is, moves from point A to point B along the curve shown in FIG. 3.

The electric field vector E is expressed by the following equation:

$$E = (E \cdot \cos F, E \cdot \sin F) \qquad \text{(Eq. 2)}$$

where F is the angle of the electric field vector E relative to the horizontal or real axis (i.e., the phase of the output beam). The square of the length of the electric field vector E (i.e., $|E|^2$) corresponds to the intensity of the output beam, P.

The following equation relates the a parameter to the phase F:

$$\frac{d\phi}{dt} = \frac{\alpha}{2} \cdot \frac{1}{P} \cdot \frac{dP}{dt} \qquad \text{(Eq. 3)}$$

The curve AB shown in FIG. 3 was obtained from the chirp characteristics of FIG. 2 by using Eq. 3.

Figure 4:
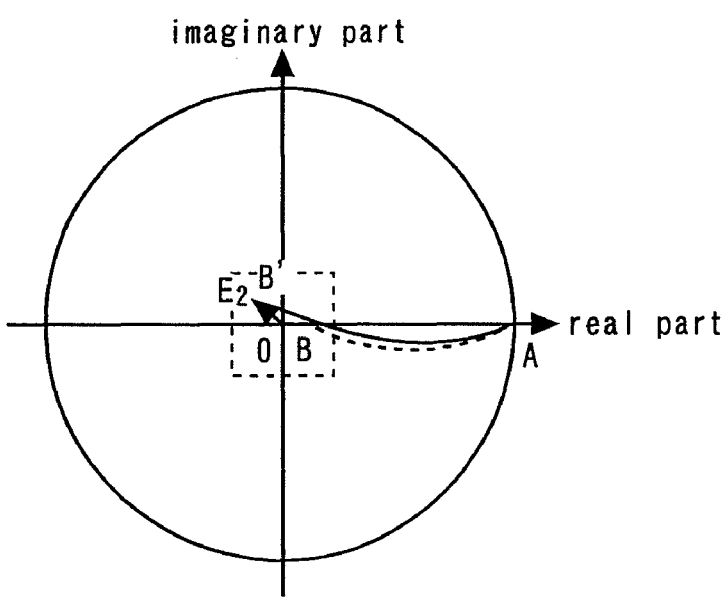
FIG. 4 is a diagram showing the electric field vector of the output beam from the optical modulation device of the present embodiment.
Figure 5:
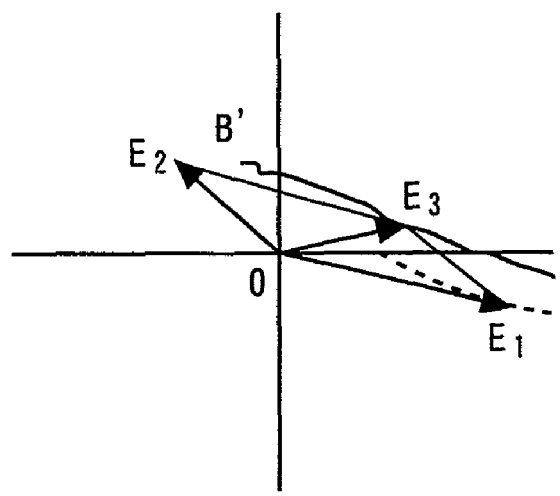
FIG. 5 is an enlarged view of the origin area of FIG. 4.

FIG. 4 is a diagram showing the electric field vector of the output beam from the optical modulation device of the present embodiment. FIG. 5 is an enlarged view of the origin area of FIG. 4.

The electric field vector $E_3$ of the output beam from the output optical waveguide 22 is the sum of the electric field vector $E_1$ of the output beam from the optical intensity modulator 16 and the electric field vector $E_2$ of the output beam from the variable optical phase shifter 18. When the optical modulation device 10 transitions from its ON state to its OFF state, the tip of the electric field vector $E_1$ of the output beam from the optical intensity modulator 16 traces out a curve AB indicated by a broken line in FIG. 4. At that time, the tip of the electric vector $E_3$ of the output beam from the output optical waveguide 22 traces out a curve A'B' indicated by the solid line in FIG. 5. That is, the chirp characteristics of the output beam of the optical modulation device 10 differ from those of the output beam of the optical intensity modulator 16.

The current injected into the variable optical phase shifter 18 may be varied to vary the refractive index of the shifter and thereby adjust the angle (or phase) F of the electric field vector $E_2$. That is, it is possible to externally adjust the amount of phase shift produced by the variable optical phase shifter 18 and thereby to control the chirp characteristics of the output beam of the optical modulation device 10. This allows the optical modulation device 10 to output a beam having the desired chirp characteristics even when the output beam of the optical intensity modulator 16 does not have intended chirp characteristics. In this way, the chirp characteristics of the output beam of the optical modulation device 10 may be varied in response to variations in the operating conditions such as temperature, the intensity and wavelength of the input light beam, the dispersion strength of the fiber, and the polarization.

Further, since the optical path including the optical intensity modulator 16 has a smaller insertion loss than the optical path including the variable optical phase shifter 18, the beam input to the variable optical phase shifter 18 has lower intensity than the beam input to the optical intensity modulator 16. This arrangement results in a reduction in the total insertion loss, as compared to when the optical modulation device 10 does not include the variable optical phase shifter 18.

Further, the output beam of the optical intensity modulator 16 has higher intensity than the output beam of the variable optical phase shifter 18 when these beams are combined by the optical combiner 20. In other words, the electric field vector $E_2$ (of the output beam from the variable optical phase shifter 18) is shorter than the electric field vector $E_1$ (of the output beam from the optical intensity modulator 16). Therefore, for example, when the optical modulation device 10 is in its ON state, the optical intensity of the output beam of the output optical waveguide 22 (represented by point A' in FIG. 4) differs only slightly from the optical intensity of the output beam of the optical intensity modulator 16 (represented by point A in FIG. 4). That is, regardless of the amount of phase shift produced by the variable optical phase shifter 18, the optical intensity of the output beam of the output optical waveguide 22 is always higher when the optical modulation device 10 is in its ON state than when it is in its OFF state (represented by point B' in FIG. 5), resulting in a high extinction ratio. This eliminates the occurrence of an erroneous bit and thereby makes the optical modulation device of the present embodiment suitable for use in optical data communications.

Figure 6:
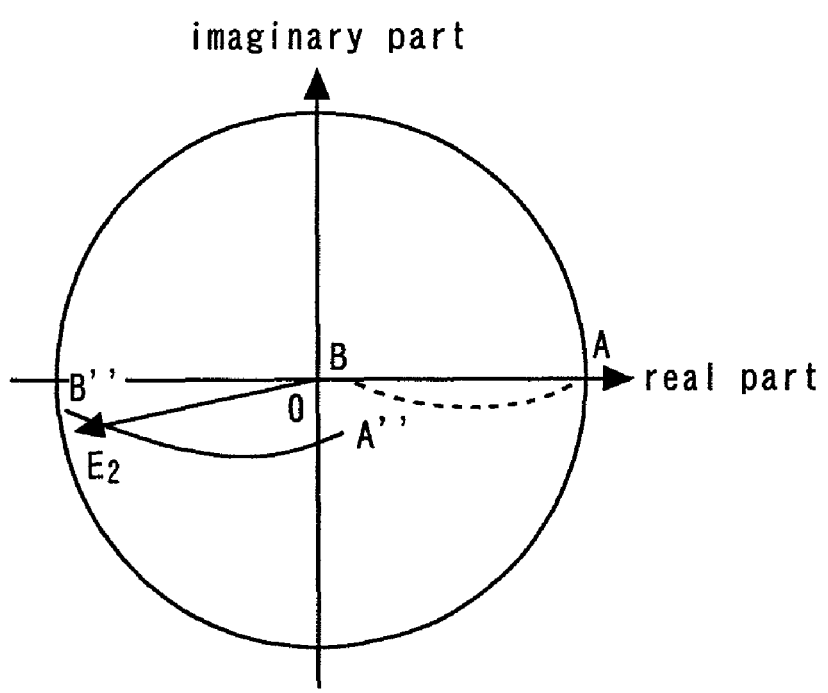
FIG. 6 shows for reference the electric field vector of the output beam of the optical modulation device when the variable optical phase shifter is adapted to output a beam of relatively high intensity.

FIG. 6 shows for reference the electric field vector of the output beam of the optical modulation device when the variable optical phase shifter is adapted to output a beam of relatively high intensity. Referring to FIG. 6, when the optical modulation device transitions from its ON state to its OFF state, the tip of the electric field vector $E_1$ of the output beam from the optical intensity modulator 16 traces out a curve AB (indicated by the broken line) and the tip of the electric field vector $E_3$ of the output beam from the output optical waveguide 22 traces out a curve A"B" (indicated by a solid line). As shown, for example, when the optical modulation device is in its ON state, the optical intensity of the output beam of the output optical waveguide 22 (represented by point A" in FIG. 6) differs significantly from the optical intensity of the output beam of the optical intensity modulator 16 (represented by point A in FIG. 6), since the optical intensity of the output beam from the variable optical phase shifter 18 is increased (i.e., the length of the electric field vector $E_2$ is increased). That is, depending on the amount of phase shift produced by the variable optical phase shifter 18, the optical intensity of the output beam of the output optical waveguide 22 may be higher when the optical modulation device is in its OFF state than when it is in its ON state, resulting in the occurrence of an erroneous bit.

Figure 7:
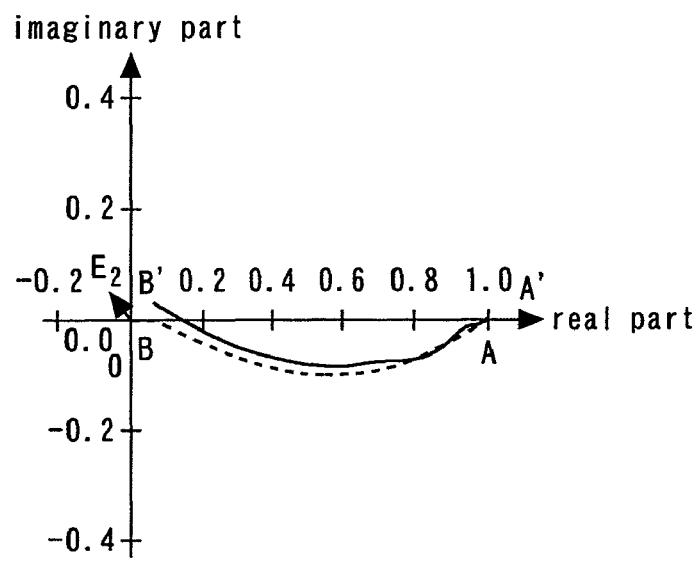
FIG. 7 shows a first parameter setting.
Figure 8:
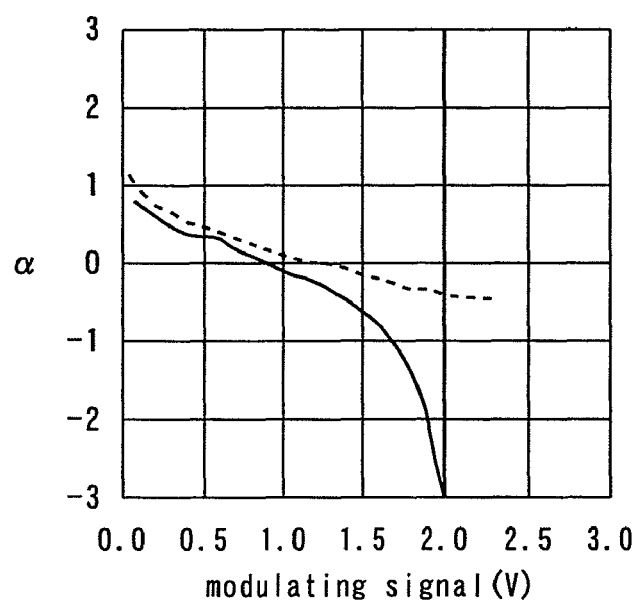
FIG. 8 shows the chirp characteristics of the output beams from the optical intensity modulator and from the optical modulation device when the device is set to the above first parameter setting.

FIG. 7 shows the electric field vector $E_1$ of the output beam of the optical intensity modulator 16 and the electric field vector $E_3$ of the output beam of the optical modulation device 10 when the electric field vector $E_2$ of the output beam of the variable optical phase shifter 18 has a magnitude of 0.1 and an angle of 2.4 radians as measured in a counterclockwise direction from the positive real axis (first parameter setting). Referring to FIG. 7, when the tip of the electric field vector $E_1$ traces out a curve AB (indicated by the broken line), the tip of the electric field vector $E_3$ traces out a curve A'B' (indicated by the solid line). FIG. 8 shows the chirp characteristics of the output beams from the optical intensity modulator and from the optical modulation device when the device is set to the above first parameter setting. As shown, the output beam of the optical modulation device 10 has a smaller a parameter than the output beam of the optical intensity modulator 16 regardless of the modulating signal voltage level. This means that in this case the optical modulation device can be used to improve the transmission characteristics of positive dispersion fiber, as compared to an optical modulation device which does not include a variable optical phase shifter.

Figure 9:
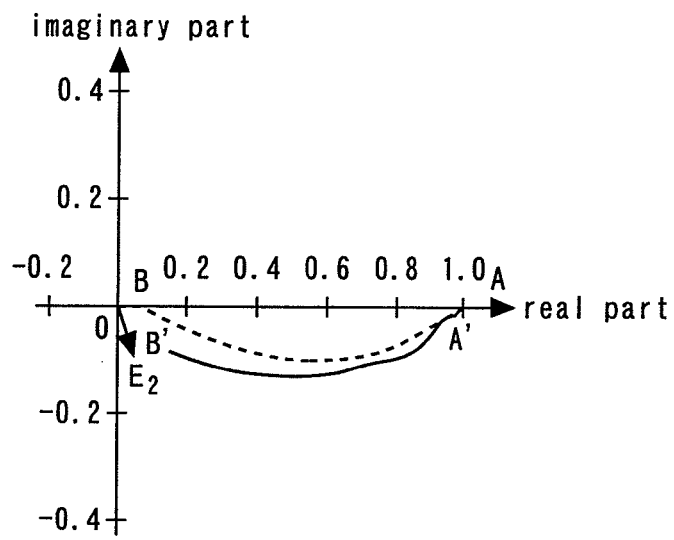
FIG. 9 shows a second parameter setting.
Figure 10:
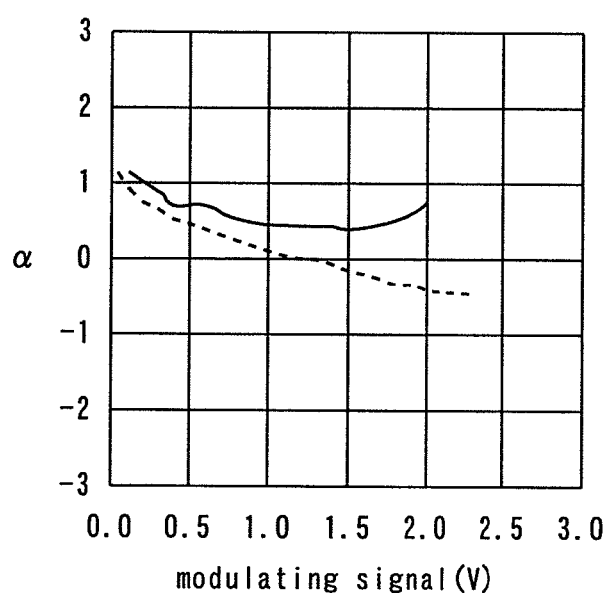
FIG. 10 shows the chirp characteristics of the output beams from the optical intensity modulator and from the optical modulation device when the device is set to the above second parameter setting.

FIG. 9 shows the electric field vector $E_1$ of the output beam of the optical intensity modulator 16 and the electric field vector $E_3$ of the output beam of the optical modulation device 10 when the electric field vector $E_2$ of the output beam of the variable optical phase shifter 18 has a magnitude of 0.1 and an angle of 5.2 radians as measured in a counterclockwise direction from the positive real axis (second parameter setting). Referring to FIG. 9, when the tip of the electric field vector $E_1$ traces out a curve AB (indicated by the broken line), the tip of the electric field vector $E_3$ traces out a curve A'B' (indicated by the solid line). FIG. 10 shows the chirp characteristics of the output beams from the optical intensity modulator and from the optical modulation device when the device is set to the above second parameter setting. As shown, the output beam of the optical modulation device has a larger a parameter than the output beam of the optical intensity modulator 16 regardless of the modulating signal voltage level. This means that in this case the optical modulation device can be used to improve the transmission characteristics of negative dispersion fiber, as compared to an optical modulation device which does not include a variable optical phase shifter.

Although the optical intensity modulator 16 of the present embodiment has been described as an electro absorption optical modulator, it is to be understood that other types of optical modulators such as a Mach-Zehnder optical modulator may be used instead of an electro absorption optical modulator. That is, the use of a Mach-Zehnder optical modulator (adapted according to the present embodiment) allows the extinction ratio and chirp characteristics of the optical modulation device to be corrected or improved in the same manner as described above, even in modulation systems, such as CS-RZ, DPSK, and DQPSK, which cannot be directly accommodated by an electro absorption optical modulator.

Further, although the optical splitter 14 and the optical combiner 20 of the present embodiment have been described as a Y-shaped splitting waveguide and a Y-shaped combining waveguide, respectively, it is to be understood that multimode interference (MMI) waveguides having the same functions as the splitting and combining waveguides may be used instead.

Second Embodiment

Figure 11:
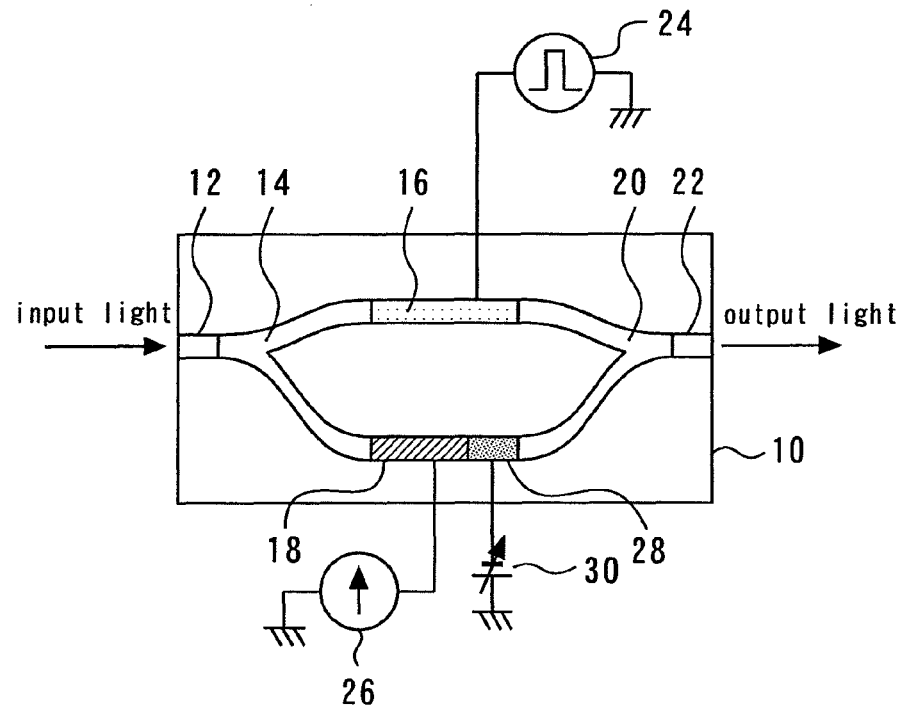
FIG. 11 is a diagram showing an optical modulation device according to a second embodiment of the present invention.

FIG. 11 is a diagram showing an optical modulation device according to a second embodiment of the present invention. It should be noted that those components common to the first embodiment retain the same reference numerals and will not be further described.

The optical modulation device, 10, of the present embodiment differs from that of the first embodiment in that it additionally includes a variable optical attenuator 28 for attenuating the intensity of the second input beam. The insertion loss of the variable optical attenuator 28 varies in accordance with the voltage applied thereto by an external power supply 30. That is, the amount of attenuation produced by the variable optical attenuator 28 can be externally controlled.

Therefore, it is possible to vary the intensity of the output beam of the variable optical phase shifter 18, as well as the angle (or phase) of the electric field vector $E_2$ of the beam, thereby enabling the chirp characteristics of the output beam of the optical modulation device 10 to be adjusted over a wider range than in the first embodiment.

Third Embodiment

Figure 12:
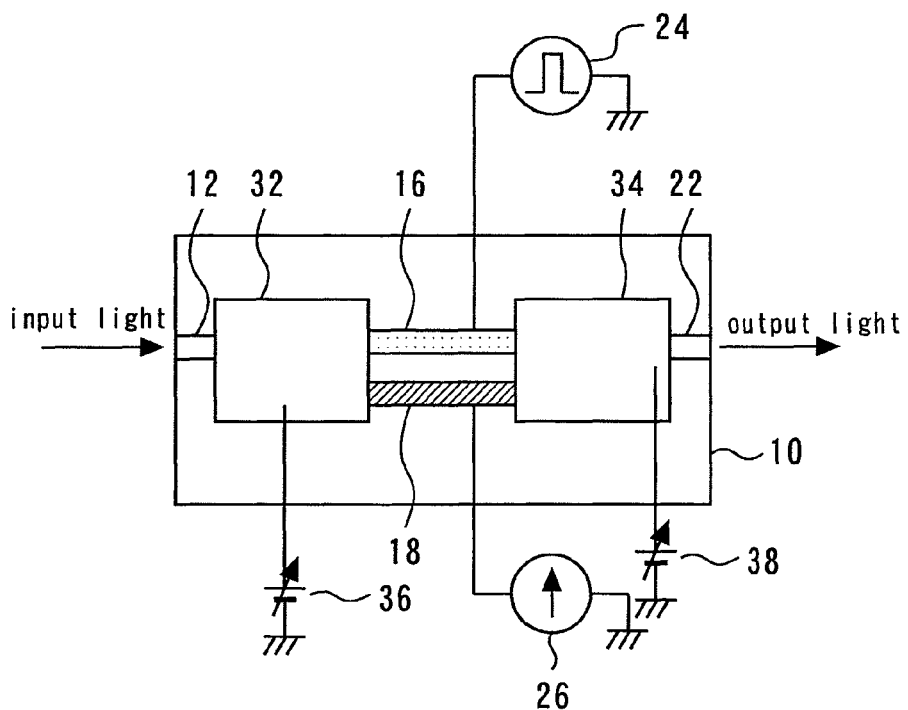
FIG. 12 is a diagram showing an optical modulation device according to a third embodiment of the present invention.

FIG. 12 is a diagram showing an optical modulation device according to a third embodiment of the present invention. It should be noted that those components common to the first embodiment retain the same reference numerals and will not be further described.

The optical modulation device, 10, of the present embodiment differs from that of the first embodiment in that the optical splitter 14 and the optical combiner 20 are replaced by a variable branching ratio input multimode interference (MMI) coupler 32 and a variable branching ratio output multimode interference coupler 34, respectively. These couplers 32 and 34 function as an optical splitter and an optical combiner, respectively. The variable branching ratio input multimode interference coupler 32 and the variable branching ratio output multimode interference coupler 34 may be of the type described in Leuthold et al., JOURNAL OF LIGHTWAVE TECHNOLOGY, VOL. 19, NO. 5, pp. 700-707, MAY 2001.

The variable branching ratio input multimode interference coupler 32 varies the ratio between the first input beam and the second input beam in response to a voltage received from an external power supply 36. The variable branching ratio output multimode interference coupler 34, on the other hand, varies the ratio in which the output beams from the optical intensity modulator 16 and from the variable optical phase shifter 18 are combined, in response to a voltage received from an external power supply 38. Thus, the variable branching ratio input multimode interference coupler 32 allows external adjustment of the ratio between the first and second input beams, while the variable branching ratio output multimode interference coupler 34 allows external adjustment of the ratio in which to combine the output beams from the optical intensity modulator 16 and from the variable optical phase shifter 18.

Therefore, it is possible to vary the intensity of the output beam of the variable optical phase shifter 18, as well as the angle (or phase) of the electric field vector $E_2$ of the beam, thereby enabling the chirp characteristics of the output beam of the optical modulation device 10 to be adjusted over a wider range than in the first embodiment. Further, the present embodiment can reduce the insertion loss of the optical modulation device 10, as compared to the second embodiment.

Fourth Embodiment

Figure 13:
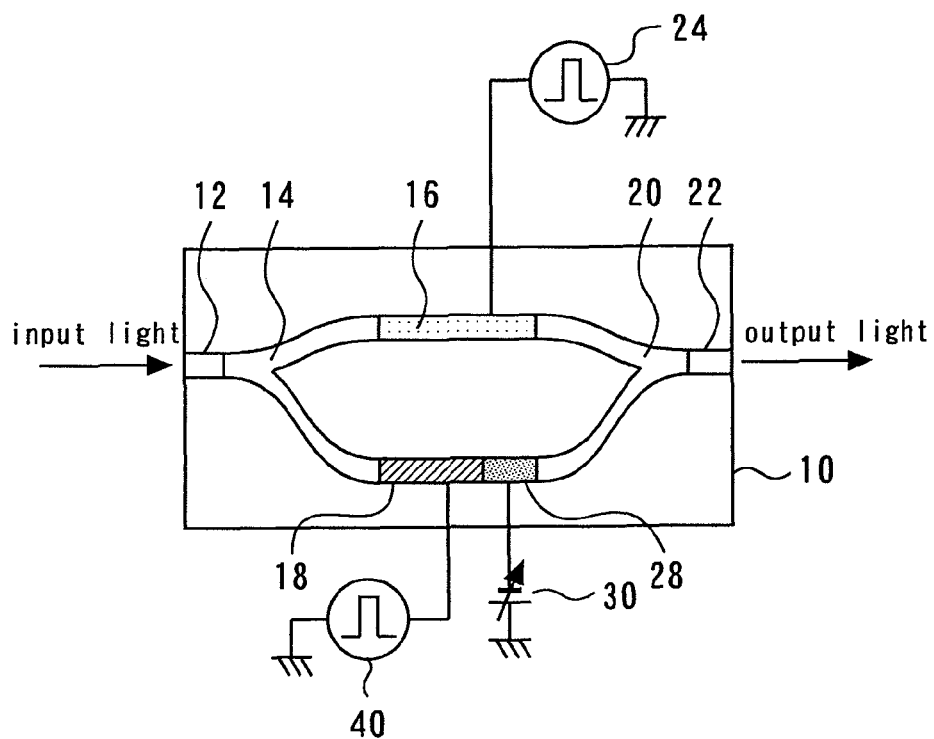
FIG. 13 is a diagram showing an optical modulation device 10 according to a fourth embodiment of the present invention.

FIG. 13 is a diagram showing an optical modulation device 10 according to a fourth embodiment of the present invention. It should be noted that those components common to the first and second embodiments retain the same reference numerals and will not be further described.

The optical modulation device 10 of the present embodiment differs from that of the second embodiment in that the variable optical phase shifter 18 is driven by the external modulator driver 24 or another modulating signal source 40 such that the shifter operates at high speed in sync with the modulating signal supplied to the optical intensity modulator 16. This allows the optical modulation device 10 to exhibit the desired chirp characteristics both in its ON and OFF states. Further, the transient response characteristics of the optical modulation device can be adjusted such that the device produces an optimum transient response to the modulating signal which is applied to the device to correct its chirp characteristics.

The modulating signal for driving the variable optical phase shifter 18 may have the same or opposite polarity as the modulating signal from the modulator driver 24. Further, the modulating signal source 40 may include a filter circuit for delaying the transient response or for causing overshoot in the response.

Fifth Embodiment

Figure 14:
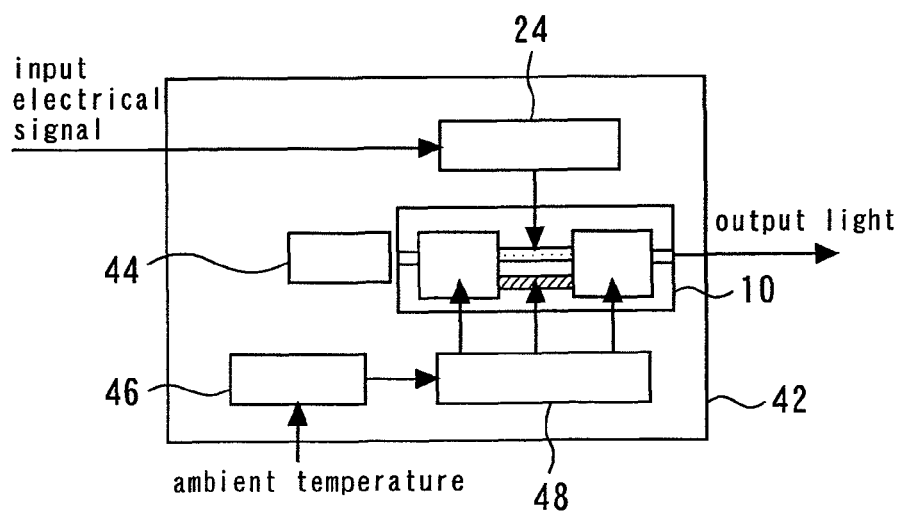
FIG. 14 is a diagram showing an optical semiconductor device according to a fifth embodiment of the present invention.

FIG. 14 is a diagram showing an optical semiconductor device according to a fifth embodiment of the present invention. The optical semiconductor device, 42, includes an optical modulation device 10, a semiconductor laser 44, a modulator driver 24, a thermistor 46, and a control circuit 48.

The optical modulation device 10 has the same configuration as in the third embodiment. The optical modulation device 10 and the semiconductor laser 44 are monolithically or hybrid integrated together. The modulator driver 24 supplies a modulating signal to the optical intensity modulator 16 of the optical modulation device 10 in response to an externally generated input electrical signal.

The thermistor 46 detects the ambient temperature and sends a signal indicative thereof to the control circuit 48. The control circuit 48 adjusts the output beam of the optical modulation device 10 such that its chirp characteristics are less temperature dependent than the chirp characteristics of the output beam of the optical intensity modulator 16. This is accomplished by varying at least one of the following in accordance with the ambient temperature: the amount of phase shift produced by the variable optical phase shifter 18; the ratio of the first input beam to the second input beam emerging from the optical splitter 14; and the ratio at which the optical combiner 20 combines the output beams from the optical intensity modulator 16 and from the variable optical phase shifter 18.

Figure 15:
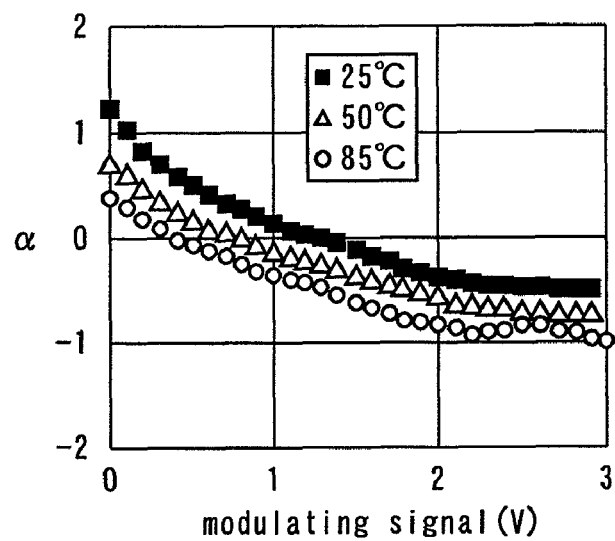
FIG. 15 is a graph showing the temperature dependence of the chirp characteristics of the optical intensity modulator.
Figure 16:
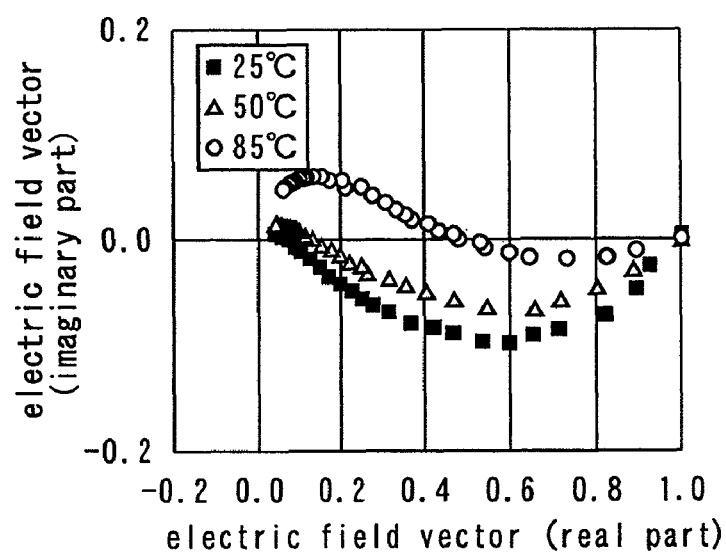
FIG. 16 shows plots of the electric field vector of the output beam from the optical intensity modulator at different temperatures.
Figure 17:
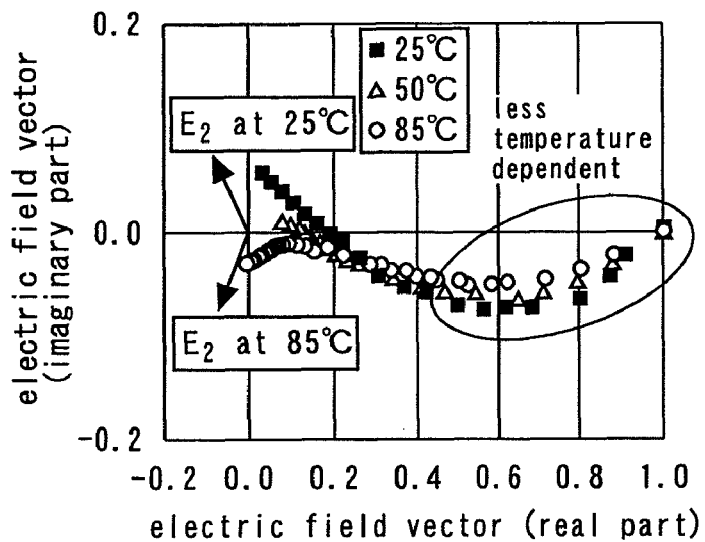
FIG. 17, on the other hand, shows plots of the electric field vector of the output beam from the optical modulation device of the present embodiment at different temperatures.

FIG. 15 is a graph showing the temperature dependence of the chirp characteristics of the optical intensity modulator. As shown, the chirp increases with decreasing temperature. FIG. 16 shows plots of the electric field vector of the output beam from the optical intensity modulator at different temperatures. FIG. 17, on the other hand, shows plots of the electric field vector of the output beam from the optical modulation device of the present embodiment at different temperatures. These figures indicate that the phase and/or intensity of the output beam of the optical intensity modulator 16 may be adjusted by the control circuit 48 based on the ambient temperature to reduce the temperature dependence of the chirp characteristics of the output beam of the optical modulation device 10.

Figure 18:
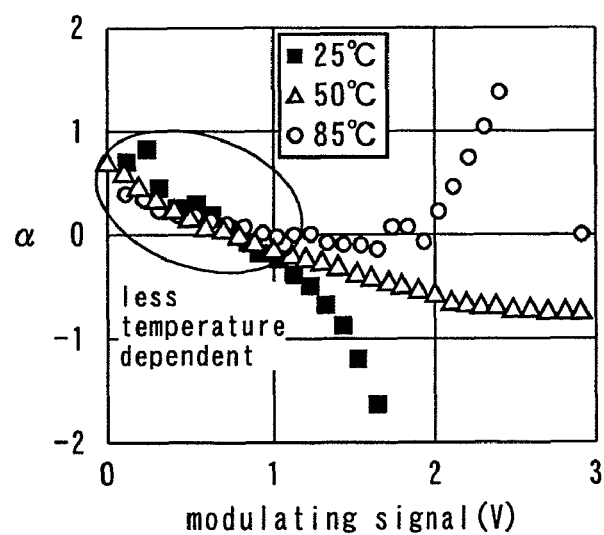
FIG. 18 is a graph showing the temperature dependence of the chirp characteristics of the optical modulation device of the present embodiment.

FIG. 18 is a graph showing the temperature dependence of the chirp characteristics of the optical modulation device of the present embodiment. This graph is prepared using the data shown in FIG. 16. As shown, the chirp characteristics of the optical modulation device 10 are less temperature dependent than those of the optical intensity modulator 16.

Therefore, the optical semiconductor device 42 of the present embodiment achieves the desired performance characteristics independently of the ambient temperature. Furthermore, the device does not require a peltiert device to maintain its temperature constant, resulting in lower cost, lower power consumption, and smaller size. Further, the optical semiconductor device 42 can achieve a modulation bit rate of 40 Gbit/s or more, which is difficult to achieve by direct modulation. This makes the optical semiconductor device 42 suitable for use in ultrahigh speed optical fiber data communications.

Further, the optical modulation device 10 may be formed of a semiconductor material having a high degree of long term reliability, such as InGaAsP, with the result that not only are the chirp characteristics of the device little temperature dependent, but also it is capable of reliable operation over an extended period of time.

It should be noted that the optical modulation device 10 of the present embodiment may have the same configuration as in the first embodiment. In such a case, the control circuit 48 adjusts the amount of phase shift produced by the variable optical phase shifter 18 based on the ambient temperature such that the chirp characteristics of the output beam of the optical modulation device 10 are less temperature dependent than those of the output beam of the optical intensity modulator 16.

Further, the optical modulation device 10 of the present embodiment may have the same configuration as in the second embodiment. In such a case, the control circuit 48 adjusts the amount of phase shift produced by the variable optical phase shifter 18 and/or the amount of attenuation produced by the variable optical attenuator 28 based on the ambient temperature such that the chirp characteristics of the output beam of the optical modulation device 10 are less temperature dependent than those of the output beam of the optical intensity modulator 16.

Sixth Embodiment

Figure 19:
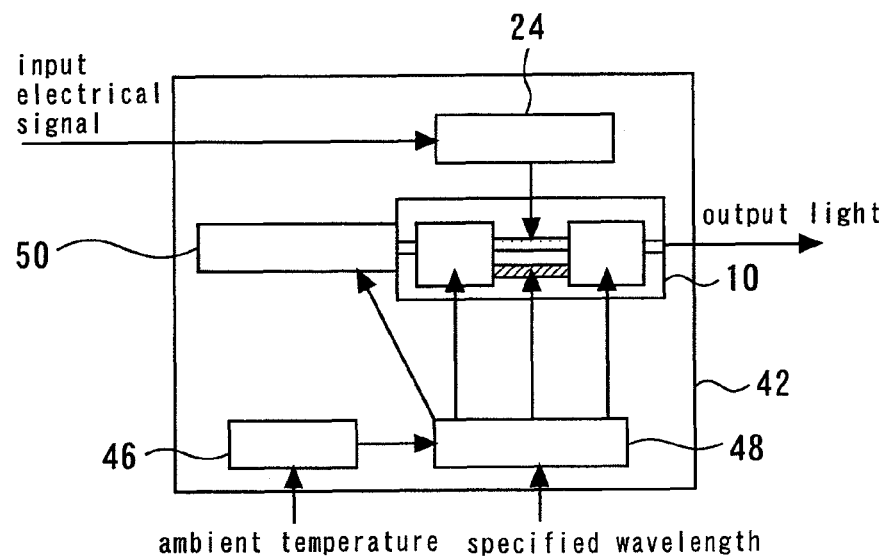
FIG. 19 is a diagram showing an optical semiconductor device according to a sixth embodiment of the present invention.

FIG. 19 is a diagram showing an optical semiconductor device according to a sixth embodiment of the present invention. It should be noted that those components common to the fifth embodiment retain the same reference numerals and will not be further described.

The optical semiconductor device of the present embodiment differs from that of the fifth embodiment in that the semiconductor laser 44 is replaced by a variable wavelength laser 50 with the capability of varying its wavelength, wherein the variable wavelength laser 50 is monolithically or hybrid integrated with the optical modulation device 10. The control circuit 48 adjusts the oscillation wavelength of the variable wavelength laser 50 to a wavelength specified externally. The control circuit 48 also adjusts the output beam of the optical modulation device 10 such that its chirp characteristics are less wavelength dependent than the chirp characteristics of the output beam of the optical intensity modulator 16. This is accomplished by varying at least one of the following in accordance with the wavelength of the input light beam (i.e., the specified wavelength): the amount of phase shift produced by the variable optical phase shifter 18; the ratio of the first input beam to the second input beam emerging from the optical splitter 14; and the ratio at which the optical combiner 20 combines the output beams from the optical intensity modulator 16 and from the variable optical phase shifter 18.

Generally, the chirp characteristics of the optical intensity modulator 16 vary with variations in the wavelength of the input light beam as well as with variations in the ambient temperature. Therefore, the optical modulation device 10 may be controlled based on the specified wavelength so as to exhibit the desired performance characteristics independently of wavelength. Especially, when the optical intensity modulator 16 is a semiconductor Mach-Zehnder modulator or electro absorption optical modulator, the characteristics of the optical modulation device 10 vary depending on the difference between the wavelength of the input light beam and the band gap wavelength of the optical intensity modulator 16. Since the band gap wavelength of the optical intensity modulator 16 varies with temperature, variations in the wavelength of the input light beam can be accommodated in the same manner as in the fifth embodiment.

It should be noted that the optical modulation device 10 of the present embodiment may have the same configuration as in the first embodiment. In such a case, the control circuit 48 adjusts the amount of phase shift produced by the variable optical phase shifter 18 based on the wavelength of the input light beam such that the chirp characteristics of the output beam of the optical modulation device 10 are less wavelength dependent than those of the output beam of the optical intensity modulator 16.

Further, the optical modulation device 10 of the present embodiment may have the same configuration as in the second embodiment. In such a case, the control circuit 48 adjusts the amount of phase shift produced by the variable optical phase shifter 18 and/or the amount of attenuation produced by the variable optical attenuator 28 based on the wavelength of the input light beam such that the chirp characteristics of the output beam of the optical modulation device 10 are less wavelength dependent than those of the output beam of the optical intensity modulator 16.

Seventh Embodiment

Figure 20:
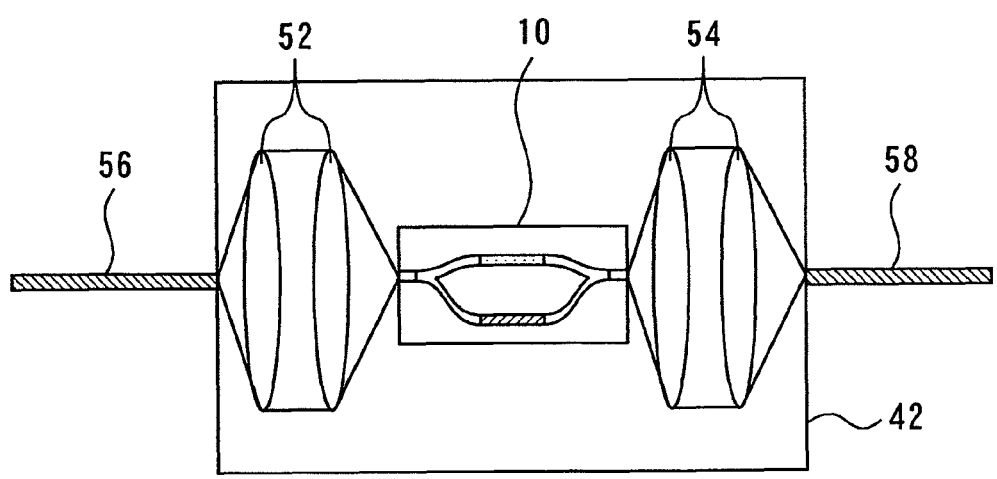
FIG. 20 is a diagram showing an optical semiconductor device according to a seventh embodiment of the present invention.

FIG. 20 is a diagram showing an optical semiconductor device according to a seventh embodiment of the present invention. The optical semiconductor device, 42, is an optical module including an optical modulation device 10 and lenses 52 and 54. The optical modulation device 10 of the present embodiment may be any one of the optical modulation devices of the first to fourth embodiments. Light from an optical fiber 56 of an external optical system is introduced into the optical modulation device 10 through the lens 52. The output beam of the optical modulation device 10 is directed into an optical fiber 58 of an external optical system through the lens 54.

Eighth Embodiment

Figure 21:
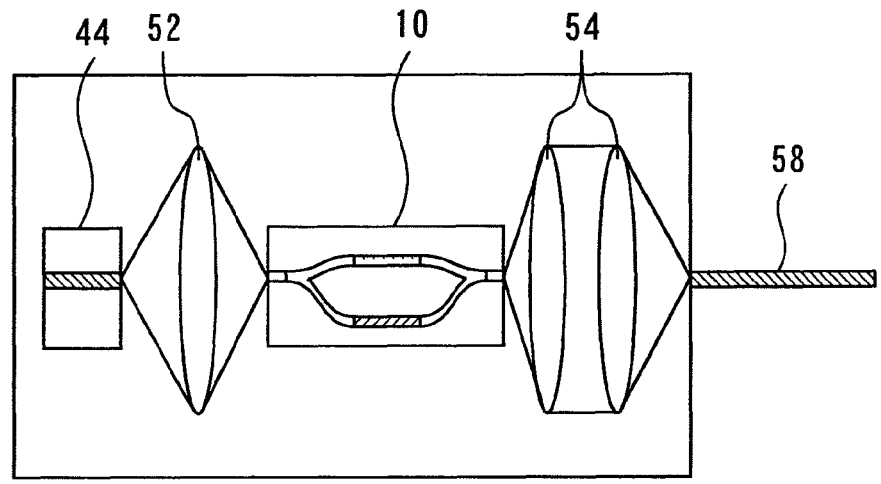
FIG. 21 is a diagram showing an optical semiconductor device according to an eighth embodiment of the present invention.

FIG. 21 is a diagram showing an optical semiconductor device according to an eighth embodiment of the present invention. It should be noted that those components common to the seventh embodiment retain the same reference numerals and will not be further described.

The optical semiconductor device of the present embodiment differs from that of the seventh embodiment in that it additionally includes a semiconductor laser 44 which is optically coupled through the lens 52 to the optical modulation device 10 (hybrid integration). Thus, the present embodiment allows for a reduction in the parts count of the module including the optical source, as compared to the seventh embodiment, resulting in reduced size of the optical transmitter.

Ninth Embodiment

Figure 22:
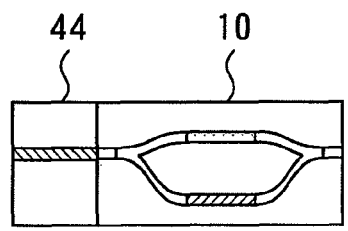
FIG. 22 is a diagram showing an optical semiconductor device according to a ninth embodiment of the present invention.

FIG. 22 is a diagram showing an optical semiconductor device according to a ninth embodiment of the present invention. In this optical semiconductor device, the optical modulation device 10 and the semiconductor laser 44 are monolithically integrated together. This significantly improves the optical coupling efficiency from the semiconductor laser 44 to the optical modulation device 10, thereby enabling the intensity of the output beam of the optical semiconductor device to be increased.

Tenth Embodiment

Figure 23:
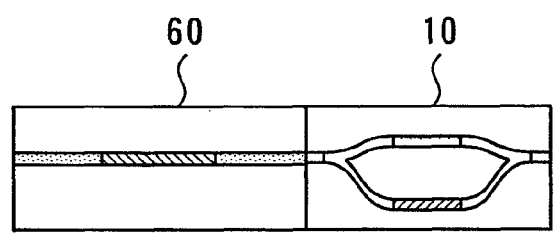
FIG. 23 is a diagram showing an optical semiconductor device according to a tenth embodiment of the present invention.

FIG. 23 is a diagram showing an optical semiconductor device according to a tenth embodiment of the present invention. In this optical semiconductor device, the optical modulation device 10 and a variable wavelength multielectrode semiconductor laser 60 are monolithically integrated together. This significantly improves the optical coupling efficiency from the variable wavelength multielectrode semiconductor laser 60 to the optical modulation device 10, thereby enabling the intensity of the output beam of the optical semiconductor device to be increased.

Eleventh Embodiment

Figure 24:
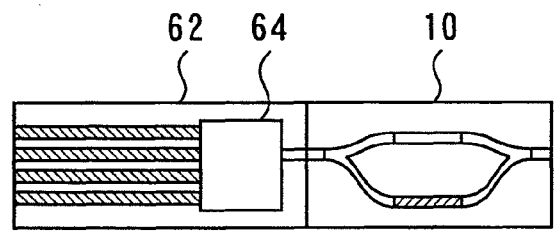
FIG. 24 is a diagram showing an optical semiconductor device according to an eleventh embodiment of the present invention.

FIG. 24 is a diagram showing an optical semiconductor device according to an eleventh embodiment of the present invention. In this optical semiconductor device, the optical modulation device 10, a variable wavelength semiconductor laser array 62, and an optical combiner 64 are monolithically integrated together, the optical combiner 64 being adapted to combine the beams of the lasers of the variable wavelength semiconductor laser array 62. This significantly improves the optical coupling efficiency from the optical combiner 64 to the optical modulation device 10, thereby enabling the intensity of the output beam of the optical semiconductor device to be increased.

Twelfth Embodiment

Figure 25:
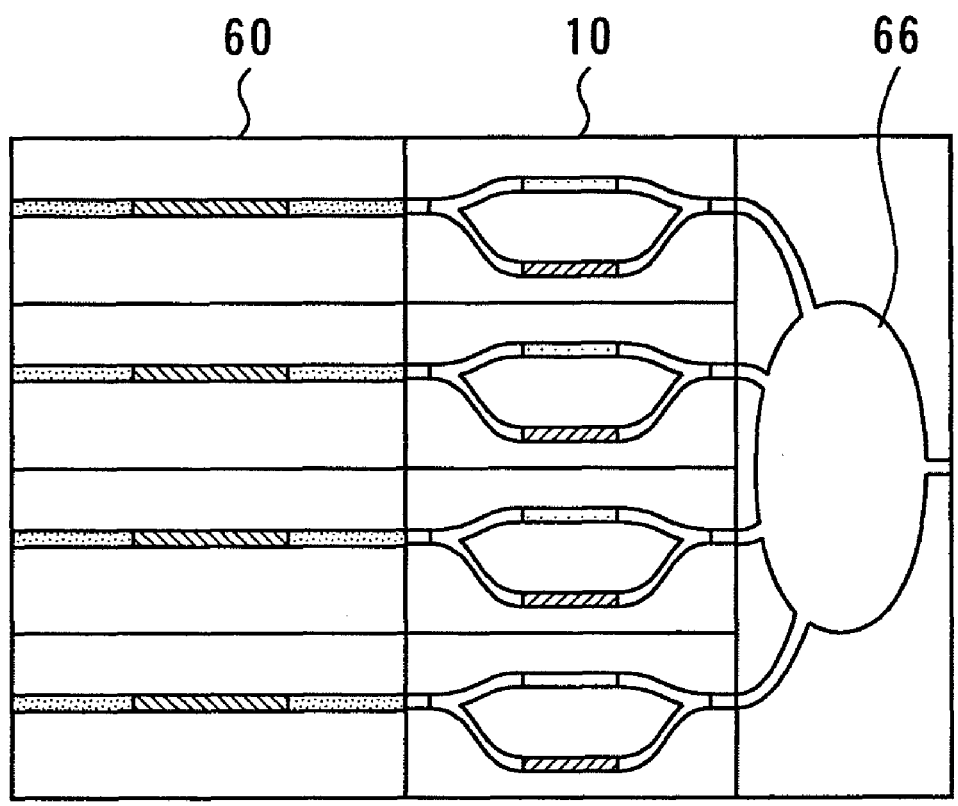
FIG. 25 is a diagram showing an optical semiconductor device according to a twelfth embodiment of the present invention.

FIG. 25 is a diagram showing an optical semiconductor device according to a twelfth embodiment of the present invention. This optical semiconductor device includes a plurality of variable wavelength multielectrode semiconductor lasers 60 (such as that of the tenth embodiment), a plurality of optical modulation devices 10 (such as that of the tenth embodiment), and an optical combiner 66. Each variable wavelength multielectrode semiconductor laser 60 is connected in series to a respective optical modulation device 10, thereby forming an arm, or branch, as shown in FIG. 25. These arms are connected in parallel to one another. The output beams of the optical modulation devices 10 are combined by the optical combiner 66. Each variable wavelength multielectrode semiconductor laser 60 covers a different wavelength band, and the optical modulation device 10 connected to the laser operates at that wavelength band. This arrangement allows the total wavelength range of the optical semiconductor device to be arbitrarily increased by increasing the number of arms (i.e., the numbers of variable wavelength multielectrode semiconductor lasers 60 and optical modulation devices 10).

Obviously many modifications and variations of the present invention are possible in the light of the above teachings. It is therefore to be understood that within the scope of the appended claims the invention maybe practiced otherwise than as specifically described.

The entire disclosure of a Japanese Patent Application No. 2008-168556, filed on Jun. 27, 2008 including specification, claims, drawings and summary, on which the Convention priority of the present application is based, are incorporated herein by reference in its entirety.

What is claimed is:

1. An optical modulation device comprising:
    an optical splitter for splitting input light into a first input beam and a second input beam;
    an optical intensity modulator for modulating intensity of the first input beam in response to a modulating signal;
    a variable optical phase shifter for shifting phase of the second input beam, wherein,
        said variable optical phase shifter has a waveguide and includes one of a semiconductor laser and a semiconductor optical amplifier,
        the second input beam travels through said waveguide, and
        said waveguide has a refractive index that varies with current injected into said variable optical phase shifter; and
    an optical combiner for combining an output beam of said optical intensity modulator and an output beam of said variable optical phase shifter into a combined beam and outputting the combined beam, wherein the phase shift produced by said variable optical phase shifter is controlled by the current that is externally injected into said variable optical phase shifter of said optical modulation device.

2. The optical modulation device as claimed in claim 1, wherein the output beam of said optical intensity modulator has higher intensity than the output beam of said variable optical phase shifter when combined by said optical combiner.

3. The optical modulation device as claimed in claim 1, wherein said optical intensity modulator is an electroabsorption optical modulator.

4. The optical modulation device as claimed in claim 1, further comprising a variable optical attenuator for attenuating the intensity of the second input beam, wherein the attenuation produced by said variable optical attenuator is controlled externally of said optical modulation device.

5. The optical modulation device as claimed in claim 1, wherein either a ratio between the first and second input beams emerging from said optical splitter, or a ratio at which said optical combiner combines the output beam of said optical intensity modulator and the output beam of said variable optical phase shifter is controlled externally of said optical modulation device.

6. The optical modulation device as claimed in claim 1, wherein said variable optical phase shifter operates in synchronism with the modulating signal applied to said optical intensity modulator.

7. An optical semiconductor device comprising:

the optical modulation device as claimed in claim 1; and a control circuit for controlling said optical modulation device, wherein said control circuit adjusts a characteristic of the output beam of said optical modulation device to be less temperature dependent than the output beam of said optical intensity modulator by varying, in accordance with ambient temperature, the phase shift produced by said variable optical phase shifter.

8. An optical semiconductor device comprising:

the optical modulation device as claimed in claim 4; and a control circuit for controlling said optical modulation device, wherein said control circuit adjusts a characteristic of the output beam of said optical modulation device to be less temperature dependent than the output beam of said optical intensity modulator by varying, in accordance with ambient temperature, at least one of the phase shift produced by said variable optical phase shifter, and attenuation produced by said variable optical attenuator, or both.

9. An optical semiconductor device comprising:

the optical modulation device as claimed in claim 5; and a control circuit for controlling said optical modulation device, wherein said control circuit adjusts a characteristic of the output beam of said optical modulation device to be less temperature dependent than the output beam of said optical intensity modulator by varying at least one of the following in accordance with ambient temperature:

the phase shift produced by said variable optical phase shifter, the ratio between the first and second input beams emerging from said optical splitter, and the ratio at which said optical combiner combines the output beam of said optical intensity modulator and the output beam of said variable optical phase shifter.

10. An optical semiconductor device comprising:

the optical modulation device as claimed in claim 1; and a control circuit for controlling said optical modulation device, wherein said control circuit adjusts a characteristic of the output beam of said optical modulation device to be less wavelength dependent than the output beam of said optical intensity modulator by varying, in accordance with the wavelength of the input light, the phase shift produced by said variable optical phase shifter.

11. An optical semiconductor device comprising:

the optical modulation device as claimed in claim 4; and a control circuit for controlling said optical modulation device, wherein said control circuit adjusts a characteristic of the output beam of said optical modulation device to be less wavelength dependent than the output beam of said optical intensity modulator by varying, in accordance with the wavelength of the input light, at least one of the phase shift produced by said variable optical phase shifter, and of the attenuation produced by said variable optical attenuator.

12. An optical semiconductor device comprising:

the optical modulation device as claimed in claim 5; and a control circuit for controlling said optical modulation device, wherein said control circuit adjusts a characteristic of the output beam of said optical modulation device to be less wavelength dependent than the output beam of said optical intensity modulator by varying at least one of the following in accordance with the wavelength of the input light:

the phase shift produced by said variable optical phase shifter, the ratio between the first and second input beams emerging from said optical splitter, and the ratio at which said optical combiner combines the output beam of said optical intensity modulator and the output beam of said variable optical phase shifter.

13. The optical semiconductor device as claimed in claim 10, further comprising a variable wavelength laser monolithically or hybrid integrated with said optical modulation device.

14. The optical modulation device as claimed in claim 1, wherein said optical intensity modulator is a Mach-Zehnder optical modulator.

15. The optical modulation device as claimed in claim 2, further comprising a variable optical attenuator for attenuating the intensity of the second input beam, wherein the attenuation produced by said variable optical attenuator is controlled externally of said optical modulation device.

16. The optical modulation device as claimed in claim 3, further comprising a variable optical attenuator for attenuating the intensity of the second input beam, wherein the attenuation produced by said variable optical attenuator is controlled externally of said optical modulation device.

* * * * *